(12) United States Patent
Skinner et al.

(10) Patent No.: US 9,800,139 B2
(45) Date of Patent: Oct. 24, 2017

(54) MOTOR CONTROL SYSTEM AND METHOD FOR INPUT CURRENT PROTECTION

(71) Applicant: Nidec Motor Corporation, St. Louis, MO (US)

(72) Inventors: James L. Skinner, Collinsville, IL (US); Prakash B. Shahi, St. Louis, MO (US); Bret S. Clark, St. Louis, MO (US); Douglas D. Glenn, Litchfield, IL (US); Christopher D. Schock, O'Fallon, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 14/332,208

(22) Filed: Jul. 15, 2014

(65) Prior Publication Data

US 2016/0020716 A1    Jan. 21, 2016

(51) Int. Cl.
*H02H 7/122*    (2006.01)
*H02M 1/42*    (2007.01)
*H02P 29/032*    (2016.01)
*H02M 1/32*    (2007.01)

(52) U.S. Cl.
CPC .......... *H02M 1/4216* (2013.01); *H02M 1/32* (2013.01); *H02P 29/032* (2016.02); *Y02B 70/126* (2013.01)

(58) Field of Classification Search
CPC .. H02P 2201/15; H02P 23/0081; H02M 1/42; H02M 1/4208; H02H 3/48
USPC .................................. 363/56.01, 37; 307/64
See application file for complete search history.

(56) References Cited

U.S. PATENT DOCUMENTS

| | | | | |
|---|---|---|---|---|
| 5,206,575 | A * | 4/1993 | Nakamura | H02P 6/002 318/807 |
| 6,191,565 | B1 * | 2/2001 | Lee | G05F 1/70 323/207 |
| 7,453,248 | B2 * | 11/2008 | Takeuchi | H02M 1/4225 323/284 |
| 2005/0280385 | A1 * | 12/2005 | Haller | H02M 1/10 318/434 |
| 2006/0113954 | A1 * | 6/2006 | Ma | H02P 21/0089 318/803 |
| 2007/0108771 | A1 * | 5/2007 | Jones | H02P 9/102 290/44 |
| 2013/0043846 | A1 * | 2/2013 | Murdock | H02M 1/4225 323/205 |
| 2013/0123989 | A1 * | 5/2013 | Krolak | H02P 27/08 700/275 |
| 2013/0182470 | A1 * | 7/2013 | Chen | H02M 7/537 363/56.01 |

(Continued)

*Primary Examiner* — Bickey Dhakal
(74) *Attorney, Agent, or Firm* — Hovey Williams LLP

(57) ABSTRACT

A motor control system for adjusting motor speed if a current overload condition occurs. The motor control system may include a motor, a power factor correction (PFC) circuit providing current to the motor, and a signal processor. The PFC circuit may limit current provided to the motor based on an output voltage sensed by the PFC circuit. The signal processor may sense input voltage of the PFC circuit to determine a power limit, then compare sensed or calculated drive power of the motor with the power limit. If the drive power sensed or calculated is greater than the power limit, the signal processor may output a signal for reducing the drive power to the power limit. Limiting the drive power provided to the motor limits or decreases a speed of the motor.

12 Claims, 2 Drawing Sheets

(56) References Cited

U.S. PATENT DOCUMENTS

2013/0193900 A1* 8/2013 Okita ...................... H02P 5/74
                                                            318/650

* cited by examiner

MOTOR CONTROL SYSTEM AND METHOD FOR INPUT CURRENT PROTECTION

BACKGROUND

An on/off power factor control (PFC) circuit is often used in certain types of motor-driven devices, such as pool pumps and blowers. The PFC circuit is located between rectifiers receiving alternating current (AC) input and bus capacitors and inverters providing current to the motor. If the PFC circuit's input voltage is low, resulting in higher-than-normal current in the PFC circuit, the PFC circuit goes into a current limit mode.

Specifically, the pump's PFC circuit senses voltage of the bus capacitors, also referred to as the output voltage of the PFC circuit. The load on the PFC circuit dictates a threshold input voltage at which the PFC circuit goes into the current limit mode. If the PFC circuit receives low line input voltage below the threshold for a particular load (e.g., low line input voltage, high load), the PFC circuit operates in the current limit mode, limiting current to a predetermined point that is above a normal maximum operating point. The PFC and associated components may be designed with tolerances capable of handling this higher-than-normal current in the short term, but the PFC and associated components are not designed to run at this PFC current limit point for extended periods of time, due to stress on components and effects on reliability and life of the motor parts. Furthermore, there is no way of knowing if the input voltage into the PFC circuit is too low until the PFC circuit goes into the current limit mode and bus capacitor voltage falls.

SUMMARY

Embodiments of the present invention solve the above-mentioned problems and provide a distinct advance in the art of motor control systems. Specifically, embodiments of the present invention provide a motor control system configured to limit motor speed based on a power factor control (PFC) circuit's input voltage. Because reducing the motor speed reduces load on the PFC circuit, a lower input voltage can be received by the PFC circuit without placing the PFC circuit into a current limit mode.

In some embodiments of the invention, the motor control system includes an electrically-driven motor, a power factor correction (PFC) circuit, and a signal processor. The PFC circuit may have an input for receiving electrical current and an output electrically coupled to the motor. The signal processor may receive an input voltage of the PFC circuit and a power of the motor, determine a power limit based on the input voltage of the PFC circuit, and reducing power provided to the motor. Specifically, the power may be reduced to the power limit if the power sensed or determined by the signal processor is greater than the power limit.

In other embodiments of the invention, the motor control system may further include a rectifier and the PFC circuit may limit output current from the PFC circuit based on output load sensed by the PFC circuit. Furthermore, the signal processor may receive an input voltage of the PFC circuit, sense or calculate a drive power of the motor, and determine a power limit based on the input voltage. Then the signal processor may compare the drive power of the motor with the power limit and output a signal for reducing the drive power to the power limit if the drive power sensed or calculated by the signal processor is greater than the power limit.

In yet another embodiment of the invention, the motor control system may further include bus capacitors and an inverter electrically coupled between the PFC circuit and the motor. The signal processor may be a DSP control and the rectifier may be a three-phase rectifier. The DSP control receives an input voltage, calculates the power limit, and applies the power limit to the motor as described above if sensed or calculated drive power is above the power limit.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
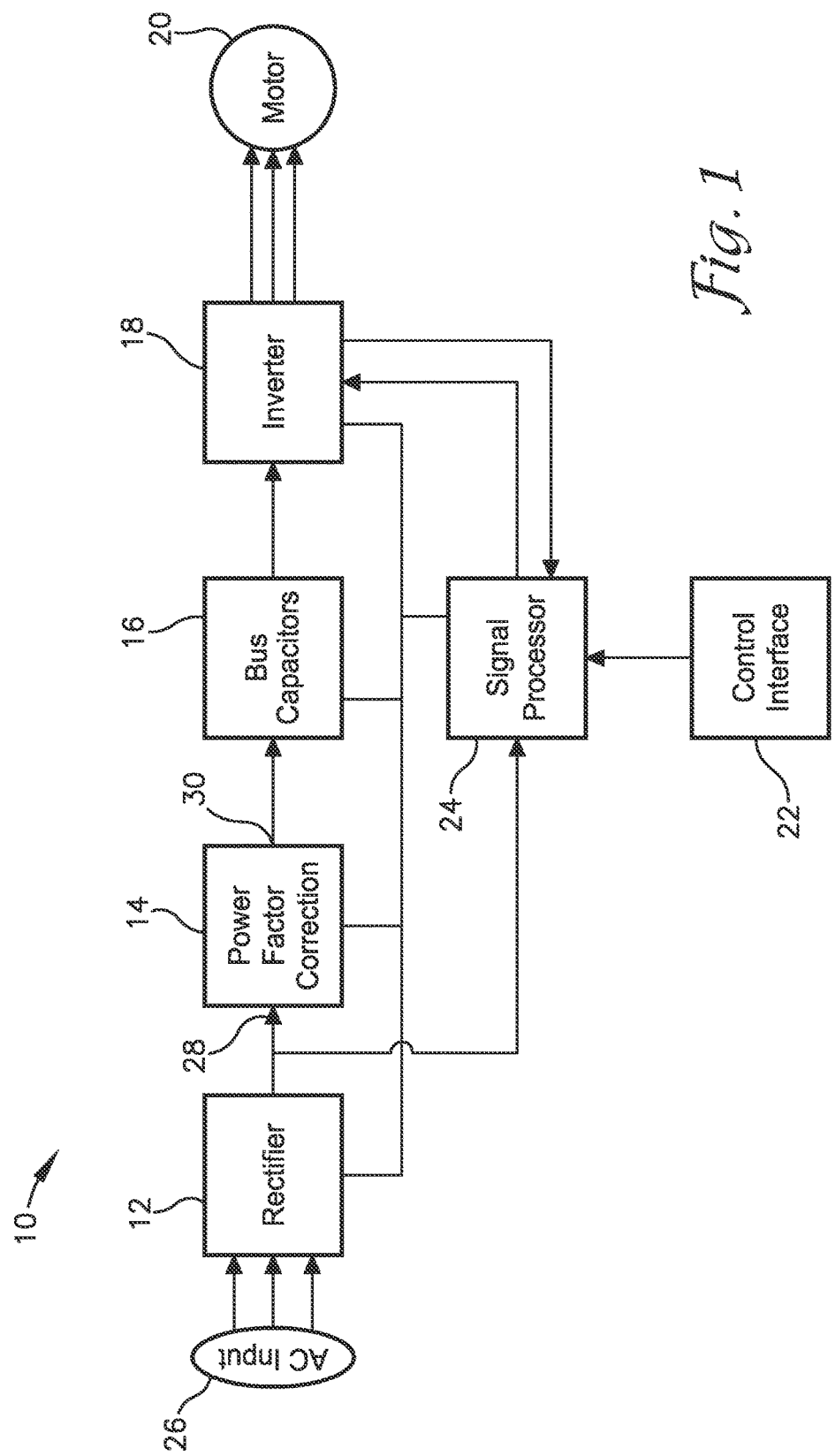
FIG. 1 is a schematic block diagram of a motor control system constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention is intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

Embodiments of the present invention include a motor control system and a method for limiting power factor control (PFC) current in the motor control system. A motor control system 10, constructed in accordance with an exemplary embodiment of the invention, is illustrated in FIG. 1 and may comprise a rectifier 12, a power factor correction (PFC) circuit 14, bus capacitors 16, an inverter 18, a motor 20, a control interface 22, and a signal processor 24, all electrically connected with each other via a common electrical line.

The rectifier 12 is configured to receive alternating current (AC) input 26 from a power source, such as via an electrical cord plugged into an electrical outlet. The rectifier 12 may include a variety of circuitry and, in some embodiments of the invention, may be a three-phase rectifier, as known in the art. In general, the rectifier 12 is configured to convert alternating current into direct current to be supplied to the PFC circuit 14.

The PFC circuit 14 may comprise any power factor correcting circuitry known in the art, such as buck and/or boost converters, for providing power factor correction to the current output by the rectifier 12. The PFC circuit 14 may include an input 28 configured for receiving an input signal from the rectifier and an output 30 configured for outputting a power to the motor 20 (e.g., via the bus capacitors 16 and/or rectifier 18). If the PFC circuit 14 receives a low line input voltage below a particular threshold for a given load or power demand from the motor 20, the PFC circuit 14 may operate in a current limit mode, outputting a predetermined amount of power. The predetermined amount of power output by the PFC circuit in this condition is typically set above a normal maximum operating point for the motor. The threshold voltage value may be dependent on the load or power demand of the motor 20. For example, the threshold voltage may be lower for a slower motor speed and higher for a higher motor speed.

As illustrated in FIG. 1, the power output from the PFC circuit 14 is passed through the bus capacitors 16 and then through the inverter 18. Specifically, the bus capacitors 16 provides filtered current to the inverter 18, and the inverter 18 provides drive power to the motor 20. The specific types or configurations of bus capacitors 16 and inverters 18 used may depend on input requirements of the motor 20 and other design limitations. Alternatively, the bus capacitors 16 and/or the inverter 18 could be replaced with other types of loads, such as, for example, a power supply, without departing from the scope of the invention.

The motor 20 may be any electrically-powered motor known in the art. For example, the motor 20 may be sized and configured for actuating a pool pump. Alternatively, the motor 20 may be sized and configured for actuating a commercial blower via a 230/460V, 3-phase commercial blower drive. The motor 20 may have a particular speed and torque controlled by the amount of current or power received by the motor 20. In some embodiments of the invention, the speed and torque of the motor may be monitored by the signal processor 24 for calculating or approximating real-time drive power of the motor 20.

The control interface 22 may comprise any electrical or communications ports or devices for providing control signals to the signal processor 24. For example, the control interface 22 may include switches to set rotation direction or other operating characteristics for the motor 20, or may include a time clock configured to set different speeds of the motor 20 at different times. The control input provided by the control interface 22 may take various forms, such as analog voltage or current, digital data, pulse width modulated signals (PWM), etc. This control input may also be provided by other equipment or input devices in the motor control system 10. For example, in a heating system, a furnace control circuit board may provide control input to the signal processor 24 and/or the control interface 22. The control interface 22 may also provide feedback to the input devices, such as actual speed or fault codes.

The signal processor 24 provides processing functionality for the motor control system 10 and may include any number of processors, microcontrollers, digital signal processing (DSP) controls, or other processing systems, and resident or external memory for storing data, constants, equations, and/or other information accessed or generated by the motor control system 10. In some embodiments of the invention, the signal processor 24 may execute one or more software programs that implement the methods and code segments described herein. The signal processor 24 is not limited by the materials from which it is formed or the processing mechanisms employed therein and, as such, may be implemented via semiconductor(s) and/or transistors (e.g., electronic integrated circuits (ICs)), and so forth.

The signal processor 24 may be communicably coupled with the rectifier 12, the PFC circuit 14, the bus capacitors 16, the inverter 18, the motor 20, and/or the control interface 22 to sense various electrical signals from and to output control signals to one or more of the components in the motor control system 10. Furthermore, the signal processor 24 may be configured to receive various control input via the control interface 22 to set various operating characteristics of the motor 20, such as a speed, torque, or flow reference indicating a selected operating speed, torque, air flow, or water flow for the motor 20.

The signal processor 24 may be programmed with code segments or otherwise configured for performing calculations using the sensed input voltage of the PFC circuit 14 and/or sensed or calculated drive power of the motor 20. In some embodiments of the invention, as illustrated in FIG. 2, the signal processor 24 may be configured to perform calculations for limiting drive power of the motor 20 if the input voltage of the PFC circuit 14 is lower than desired.

Figure 2:
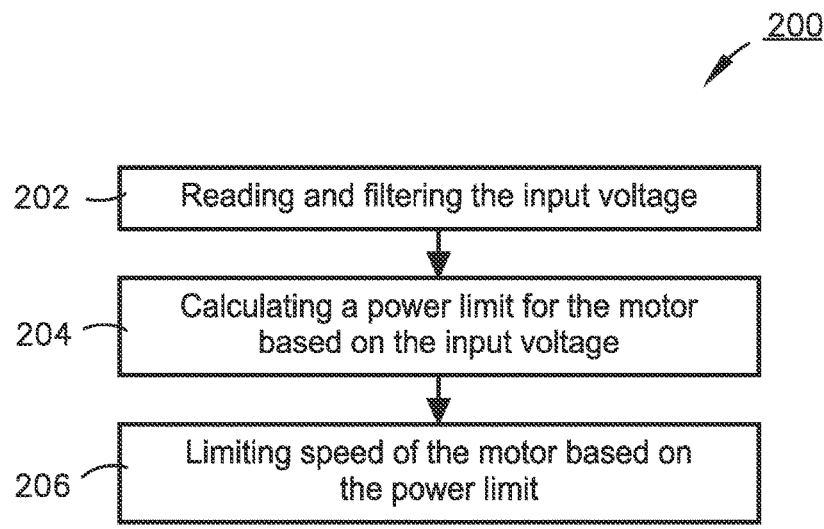
FIG. 2 is a flow chart illustrating a method of limiting motor power relative to sensed input voltage of a power factor correction (PFC) circuit of FIG. 1 in accordance with an embodiment of the present invention.

The flow chart of FIG. 2 depicts the steps of an exemplary method 200 for limiting drive power of the motor 20 based on sensed input voltage of the PFC circuit 14. In some embodiments of the invention, at least a portion of the method steps depicted in FIG. 2 may represent code segments executable by the motor control system 10 or signal processor 24 described above. In some alternative implementations, the functions noted in the various blocks may occur out of the order depicted in FIG. 2. For example, two blocks shown in succession in FIG. 2 may in fact be executed substantially concurrently, or the blocks may sometimes be executed in the reverse order depending upon the functionality involved.

The method 200 may include a step of reading and filtering the input voltage of the PFC circuit, as depicted in block 202. Specifically, the signal processor 24 may be configured to sense the voltage input into the PFC circuit 14 and/or output by the rectifier 12. In some embodiments of the invention, a resistive voltage divider (not shown) may be located between the input of the PFC circuit 14 and an input of the signal processor 24, such that the signal processor 24 may receive a voltage reduced to a level suitable for the signal processor 24 or other such circuitry. The input voltage may be filtered for noise or otherwise averaged over a given period of time by the signal processor 24 using filtering methods known in the art.

Next, the method 200 may include a step of calculating a maximum power or power limit at which to run the motor 20, based on the sensed input voltage, as depicted in block

Figure 3:
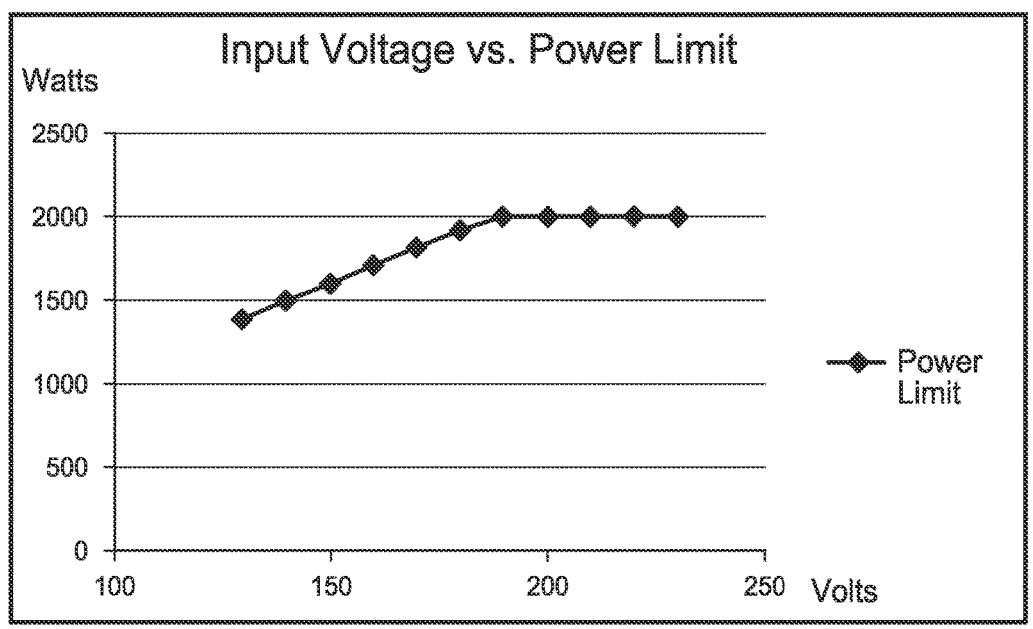
FIG. 3 is a chart illustrating exemplary power limits used by the motor control system of FIG. 1 depending on input voltage of the PFC circuit.

204. Specifically, the power limit is selected based on a desired maximum power for a particular PFC circuit input voltage, as stored in the signal processor 24 or calculated by the signal processor 24 using one or more stored constants. FIG. 3 depicts a chart illustrating an exemplary power limit or desired maximum power (y-axis) for a variety of possible input voltages (x-axis) of the PFC circuit 14. These chart values may be stored in the signal processor 24 and/or may be calculated using stored equations and constants predetermined for a given motor system based on design requirements and/or experimentation. Note that, in this example, the power limit is lower if the input voltage of the PFC circuit 14 is lower (i.e., low line input voltage).

Finally, the method 200 may include a step of limiting speed, torque, or flow of the motor 20 based on this power limit, as depicted in block 206. For example, if the signal processor 24 determines that input voltage is too low (i.e., overload condition), the signal processor 24 lowers the power limit and the motor speed may be decreased if drive power is higher than the power limit. Specifically, the signal processor 24 may be configured to measure or calculate motor drive power to be compared to the power limit from block 204. The signal processor 24 may measure the drive power of the motor 20 directly or indirectly without departing from the scope of the invention. For example, in some embodiments of the invention, the output power from the PFC circuit 14 may be sensed as drive power via the inverter 18 or the drive power may be determined by a multiplier receiving sensed speed and torque from the motor 20.

If the sensed or calculated motor power is less than the power limit, the signal processor 24 can continue to send control signals associated with those received by the control interface 22 to the inverter 18. For example, the motor 20 may continue to operate at the speed reference received by the control interface 22.

However, if the sensed or calculated drive power is greater than the power limit, a signal associated with the power limit may be output to the inverter 18 or otherwise provided to the motor 20, thus decreasing the drive power provided to the motor 20 to correspond with the power limit. This, in turn, reduces the speed of the motor 20 until the signal processor 24 once again senses that the drive power is less than the power limit corresponding to the real time sensed input voltage of the PFC circuit 14.

Advantageously, limiting the power provided to the motor 20 based on input voltage of the PFC circuit 14 prevents an overload situation, because, as previously discussed, the threshold voltage for the PFC circuit 14 is based on load or power demanded by the motor 20. If the motor speed is decreased by the signal processor 24, the load or power demand on the PFC circuit 14 is less. That is, running the motor 20 at a lower speed may prevent the PFC circuit 14 from operating in the current limit mode described above.

Although the invention has been described with reference to the particular embodiments, it is noted that equivalents may be employed and substitutions made herein without departing from the scope of the invention. Furthermore, note that the input and output signals illustrated in FIG. 1 are just some of the signals sent and received by the components of the motor control system 10. Specifically, while only two lines are illustrated to represent signal flow between the inverter 18 and the signal processor 24, note that each of those lines may represent multiple signals. For example, the signal processor 24 may generate six signals to control six inverter power switches, and three current signals from the inverter 18 may be sent to the signal processor 24. Furthermore, while some of the lines, such as the line from the bus capacitors 16 to the inverter 18, may represent electrical power, others of the lines, such as those extending between the signal processor 24 and the inverter 18, may represent non-power signals, communication signals, or signals used for control and not to power the motor 20.

Having thus described various embodiments of the invention, what is claimed as new and desired to be protected by Letters Patent includes the following:

1. A motor control system for controlling operation of an electric motor, including providing a drive power to the electric motor, the motor control system comprising:
   a power factor correction (PFC) circuit having an input for receiving an input voltage and an output electrically coupled to the electric motor, and configured to enter a current limiting mode if the input voltage is below a threshold for providing the drive power to the electric motor; and
   a signal processor configured for determining the input voltage of the PFC circuit and the drive power to the electric motor, determining a maximum drive power that is proportional to the input voltage of the PFC circuit and at which the electric motor is driven before the PFC circuit enters the current limiting mode, and limiting the drive power to the maximum drive power to prevent the PFC circuit from entering the current limiting mode.

2. The motor control system of claim 1, further comprising a rectifier electrically coupled to the PFC circuit, wherein the input voltage is measured by the signal processor at a point after the rectifier and before the PFC circuit.

3. The motor control system of claim 1, further comprising bus capacitors and an inverter electrically coupled to the PFC circuit, the electric motor, and the signal processor, wherein the electric motor receives the drive power from the inverter, and wherein a signal associated with the maximum drive power is provided from the signal processor to the inverter to limit the drive power to the electric motor to the maximum drive power.

4. The motor control system of claim 1, wherein the signal processor is a digital signal processing (DSP) control and the DSP control is configured to receive a speed, torque, or flow reference signal from a control interface, wherein the DSP control outputs signals to operate the electric motor at a speed, torque, or flow associated with the speed, torque, or flow reference signal if the drive power to the electric motor is not greater than the maximum drive power.

5. A motor control system comprising:
   an electric motor;
   a rectifier;
   a power factor correction (PFC) circuit having an input for receiving an input voltage from the rectifier and an output electrically coupled to the electric motor; and
   a signal processor configured for receiving the input voltage from the input of the PFC circuit, sensing or calculating a drive power to the electric motor, determining a maximum drive power that is proportional to the input voltage and at which the electric motor is driven before the PFC circuit enters a current limiting mode, comparing the drive power of the electric motor with the maximum drive power, and outputting a signal for reducing the drive power to the maximum drive power if the drive power sensed or calculated by the signal processor is greater than the maximum drive power.

6. The motor control system of claim 5, further comprising bus capacitors and an inverter electrically coupled to the PFC circuit, the electric motor, and the signal processor, wherein the electric motor is configured to receive the drive power from the inverter, and wherein the signal processor is configured to output to the inverter the signal for reducing the drive power to the maximum drive power.

7. The motor control system of claim 5, wherein limiting the drive power provided to the electric motor comprises limiting or decreasing a speed of the electric motor and thereby decreasing a load of the PFC circuit.

8. The motor control system of claim 5, wherein the signal processor is a digital signal processing (DSP) control.

9. The motor control of claim 5, further comprising a control interface, wherein the signal processor is configured to receive a speed, torque, or flow reference signal from the control interface, wherein the signal processor is configured to output signals for operating the electric motor at a speed, torque, or flow associated with the speed, torque, or flow reference signal if the sensed or calculated drive power to the electric motor is not greater than the maximum drive power.

10. A motor control system for controlling operation of an electric motor, including providing a drive power to the electric motor, the motor control system comprising:
   a three-phase rectifier configured to convert an alternating current into a direct current;
   a power factor correction circuit configured to
      receive the direct current from the three-phase rectifier,
      enter a current limiting mode if an input voltage to the power factor correction circuit is below a threshold for providing the drive power to the electric motor, and
      output a power factor corrected direct current;
   an inverter configured to receive the power factor corrected direct current and to output the drive power to the electric motor; and
   a digital signal processor configured to
      determine the input voltage to the power factor correction circuit,
      determine the drive power output by the inverter,
      determine a maximum drive power at which the electric motor is driven before the power factor correction circuit enters the current limiting mode, and
      if the input voltage is too low to maintain the drive power to drive the electric motor at a specified performance without exceeding the maximum drive power, limit the drive power to the maximum drive power to prevent the power factor correction circuit from entering the current limiting mode.

11. The motor control system of claim 10, wherein limiting the drive power provided to the electric motor limits or decreases a speed of the electric motor and thereby decreases a load of the PFC circuit.

12. The motor control of claim 10, further comprising a control interface, wherein the specified performance is a specified speed, and wherein the DSP control is configured to receive a speed reference signal from the control interface, and configured to output signals for operating the electric motor at a speed associated with the speed reference signal if the drive power to the electric motor is not greater than the maximum drive power.

* * * * *